(12) United States Patent
Rezvani et al.

(10) Patent No.: US 7,032,002 B1
(45) Date of Patent: *Apr. 18, 2006

(54) SERVICE BROKER FOR PROCESSING DATA FROM A DATA NETWORK

(75) Inventors: Babak Rezvani, Ossling, NY (US); Jack L. Chen, Astoria, NY (US)

(73) Assignee: Xanboo, Inc., New York, NY (US)

( * ) Notice: Subject to any disclaimer, the term of this patent is extended or adjusted under 35 U.S.C. 154(b) by 629 days.

This patent is subject to a terminal disclaimer.

(21) Appl. No.: 09/698,981

(22) Filed: Oct. 27, 2000

Related U.S. Application Data

(60) Provisional application No. 60/230,310, filed on Sep. 6, 2000.

(51) Int. Cl.
G06F 15/16 (2006.01)

(52) U.S. Cl. .................. 709/203; 709/217; 709/224; 370/449; 370/429

(58) Field of Classification Search ............... 709/203, 709/217–219, 227–229, 230, 223–225; 707/10, 707/104.1; 370/449, 429
See application file for complete search history.

(56) References Cited

U.S. PATENT DOCUMENTS

| | | | | |
|---|---|---|---|---|
| 5,329,619 A * | 7/1994 | Page et al. | ................ | 709/203 |
| 5,815,665 A * | 9/1998 | Teper et al. | ................ | 709/229 |
| 5,862,328 A * | 1/1999 | Colyer | ................ | 709/203 |
| 5,974,443 A * | 10/1999 | Jeske | ................ | 709/217 |
| 6,141,759 A * | 10/2000 | Braddy | ................ | 713/201 |
| 6,247,056 B1 * | 6/2001 | Chou et al. | ................ | 709/229 |
| 6,275,490 B1 | 8/2001 | Mattaway et al. | ................ | 370/352 |
| 6,307,857 B1 | 10/2001 | Yokoyama et al. | ................ | 370/395 |
| 6,330,602 B1 * | 12/2001 | Law et al. | ................ | 709/224 |
| 6,446,108 B1 * | 9/2002 | Rosenberg et al. | ................ | 709/203 |
| 6,463,459 B1 * | 10/2002 | Orr et al. | ................ | 709/203 |
| 6,519,632 B1 * | 2/2003 | Brackett et al. | ................ | 709/219 |
| 6,542,076 B1 | 4/2003 | Joao | ................ | 340/539 |
| 6,542,077 B1 | 4/2003 | Joao | ................ | 340/539 |
| 6,549,130 B1 | 4/2003 | Joao | ................ | 340/539 |

(Continued)

Primary Examiner—Bharat Barot
Assistant Examiner—Philip B. Tran
(74) Attorney, Agent, or Firm—Pollack, P.C.; Grant E. Pollack

(57) ABSTRACT

A method and system for communication between serverless computing devices or clients in computers communicating over networks, such as the World Wide Web (WWW) using stateless protocols, e.g., HTTP. In this scheme, there are two classes of clients which can operate independently or can be combined in computers communicating over the network: a) clients that issue commands and request status or data, and b) clients that function as service brokers for providing services and processing commands, updating status and providing specific data—resembleing a server device but without accessible TCP/IP ports. Each service providing device is authenticated, retains a unique identity and establishes a soft state with the globally accessible server or servers. All devices and clients can compile and process a globally common command language established between all communicating network clients. The central server includes a CGI processing program and a database to retain client specific information. The server database represents a collection of queues, each having a client unique identifiable status, pending commands and/or data components. In this scheme, commands and signaling transmitted between the servers and clients utilize standard HTTP protocol semantics and HTML or standard markup language syntax. Clients encapsulate or embed information as parameters passed to HTTP CGI as a set of standard HTTP conversations. A CGI processing program converts, parses or processes each conversation and passes arguments with or without data to queues.

23 Claims, 7 Drawing Sheets

U.S. PATENT DOCUMENTS

| | | | |
|---|---|---|---|
| 6,587,046 B1 | 7/2003 | Joao | 340/539.14 |
| 6,621,827 B1 * | 9/2003 | Rezvani et al. | 370/449 |
| 6,633,899 B1 * | 10/2003 | Coward | 709/217 |
| 6,681,327 B1 * | 1/2004 | Jardin | 713/201 |

* cited by examiner

SERVICE BROKER FOR PROCESSING DATA FROM A DATA NETWORK

This application claims the benefit of Provisional Application No. 60/230,310, filed Sep. 6, 2000.

FIELD OF THE INVENTION

The invention relates generally to computer networking and, more particularly, to a service broker for processing data from a data network.

Glossary of Terms

For purposes of the present invention, the following terms as used throughout the specification have the following defined meanings:

Internet
  The network of networks and gateways that use the TCP/IP suite of protocols.

TCP/IP
  Transmission Control Protocol/Internet protocol. A packet switching scheme the Internet uses to chop, route, and reconstruct the data it handles, from e-mail to video.

Client
  A client is a computer which issues commands to the server which performs the task associated with the command.

Server
  Any computer that performs a task at the command of another computer is a server. A Web server typically supports one or more clients.

Hypertext Transfer Protocol (HTTP)
  HTTP is an example of a stateless protocol, which means that every request from a client to a server is treated independently. The server has no record of previous connections. At the beginning of a URL, "http:" indicates the file contains hyperlinks.

Web Browser
  A program running on a computer that acts as an Internet tour guide, complete with pictorial desktops, directories and search tools used when a user "surfs" the Internet. In this application the Web browser is a client service which communicates with the World Wide Web.

Data Source
  An entity or set of entities which produces data of varying types, such as video, email, heartbeat transmissions, commands, and the like.

Moderator
  A device, program, or the like that receives, stores, and forwards data. The moderator may possess each of the three functionalities in one entity or each functionality may be contained in separate devices. The moderator includes a data receiving system, a data storage system, and a data transmission system.

Data Store
  An entity that can at least temporarily store data. A system in which data can be written to and retrieved.

Name/Value Pairs
  An associative pair with two portions, the "name" part and the "value" part in which the "name" is related to the "value." The value of the "name" is the "value."

Field/Value Abstraction Layer
  A method for transmitting an arbitrary number of name/value pairs within HTTP which encodes an arbitrary set of name/value pairs in other name/value pairs.
  1. Base case: one name/value pair: "field 1"/"name 1" "field 2"/"value 1"
  2. "field 3"/"name 2" "field 4"/"value 2" . . . "field (2n−1)"/"name n" "field (2n)"/"value n"

Virtual Representation
  A representation in which a control of a device can be mapped to a representative or virtual control.

Control
  Any physical, virtual, electronic, or logical entity which either causes an effective change in the real world, in a virtual space, or in software or gives an indication of an effective change in the real world, in a virtual space, or in software.

Data Transfer Protocol
  Any method by which data is organized and transmitted from a sender to a receiver.

BACKGROUND OF THE INVENTION

Networks have transformed the way people do computing. Someone with access to a personal computer or workstation can connect to the Internet and communicate with systems and people all over the world. The World Wide Web (WWW or Web) is a way of using the Internet that provides the user with access via linked documents to a wealth of information distributed throughout the globe. The WWW also allows users to execute programs running on remote servers. This capability enables users to obtain the results from programs which the user cannot run locally due to hardware and/or software limitations. It is also possible to download and run programs stored remotely on the World Wide Web. This has the potential to greatly increase the amount of software which is available to a computer connected to the World Wide Web. Network Network protocols provide standard methods for machines to communicate with one another. The protocols indicate how data should be formatted for receipt and transmission across networks. Heterogeneous machines can communicate seamlessly over a network via standard protocols. Examples of standard Internet protocols include: HTTP, see, e.g., "Hypertext Transfer Protocol—HTTP/1.0", http://www.ics.uci edu/pub/ietf/http/draft-ietf-http-v10-spec-03.html, by T. Berners-Lee, R. Fielding, and H. Frystyk, Sep. 4, 1995; SMTP, see, e.g, "Simple Mail Transfer Protocol". RFC 821, J. B. Postel, Information Sciences Institute, USC, August 1982, http://ds.internic.net/std/std10.txt.; NNTP, see, e.g., "Network News Transfer Protocol: A Proposed Standard for the Stream-Based Transmission of News", RFC 977, B. Kantor and P. Lapsley, UC San Diego and UC Berkeley, February 1986, http://ds.internic-.net/rfc/rfc977.txt.; FTP, see e.g., J. Postel and J. K. Reynolds. "File Transfer Protocol (FTP)", RFC 959, Information Sciences Institute, USC, October 1985, http://ds.internic.net/std/std9.txt.; Gopher, see, e.g., F. Anklesaria, M. McCahill, P. Lindner, D. Johnson, D. Torrey, and B. Alberti. "The Internet Gopher Protocol: A distributed document search and retrieval protocol", RFC 1436, University of Minnesota, March 1993, http://ds.internic.net/rfc/rfc1436.txt.; and WAIS, see, e.g., F. Davis, B. Kahle, H. Morris, J. Salem, T. Shen, R. Wang, J. Sui, and M. Grinbaum. "WAIS Interface Protocol Prototype Functional Specification" (v 1.5), Thinking Machines Corporation, April 1990.

The client-server model constitutes one of the dominant paradigms in network programming, see, e.g., W. R. Stevens, "Unix Network Programming", Prentice Hall PTR, Englewood Cliffs, N.J., 1990; and D. E. Corner, "Internetworking with TCP/IP" vol 1., Prentice Hall, Englewood Cliffs, N.J., 1991 which is hereby incorporated by reference in its entirety. A server program offers a service which can be accessed by multiple users over the network. A program becomes a client when it sends a message to a server and waits for a response from the server. The client process, which is typically optimized for user interaction, uses the requested service without having to know any of the detailed workings of the requested service or server. On the World Wide Web, "browsers" constitute client programs while the programs sending back information to the browser constitute server programs.

Data transfer between client and server can be achieved by many different TCP protocols such as File Transfer Protocol. In the recent years HTTP has become the defacto access protocol between web servers and client browsers. Due to HTTPs ubiquitous presence on the Internet most network administrators provide access methods for HTTP clients to gain access to Internet servers with HTTP services within their private net and gain access by users client browsers. HTTP is a stateless protocol; every request from the client to the server is treated independently. The server has no record of previous connections. The advantages of using stateless protocol are efficiency and simplicity.

Clients can send and receive data from an Internet based system, but in order to protect private or enterprise data, in many instances access to a server services are hidden behind a private net firewall or other protection mechanism and can only be accessed within the same network subnet. In such cases the server is not visible by common Internet clients. Additionally, services provided by ad hoc network servers, which can be based on mobile or temporary Internet services, require complex system administration and can create a challenge for the average individual. Other system and network issues include such matters as scalability, resource management, security, and access control, each requiring technical depth, lengthy lead time to assemble, and ongoing maintenance that can become costly. In most cases the user has to invest a great deal of time and expense. The services are limited and devices which provide services are not user friendly. The system setup and service access can present problems.

In virtually all client/server systems today, there exist two main entities which each play a crucial role in the transmission of data. A client, sender, or data source must package data in a format which can be transported over the network using one of a variety of networking protocols. A receiver or service broker must then be able to unpack the data and make use of it in its original form. It is this latter side of the data transmission relationship that we are interested in.

In order for applications running on the receivers today to obtain the transmitted data from the senders, those receivers must implement a server. A server is often a program, either in hardware or software on the receiver, which listens for incoming data. When data arrives on the receiver, it is already tagged to be delivered to a particular port on the receiver. If no listener, i.e., a server, is registered with the port on the low level network driver on the receiver, the data cannot make it to the appropriate application that the data is intended for because no server is there to hand the data to the applications for high-level processing. The server is often responsible for unpacking the data and stripping off the envelopes which encapsulate the protocol information inside of which the client packaged the data. Such an unpackaging entity on the server is called the protocol stack. At each rung up the protocol stack, the server is responsible for keeping track of the information relevant to the protocols implemented at that layer as well as performing all necessary processing to carry out the functionality at that layer.

As the size of a server increases, i.e., as the number of possible incoming connections increases, the complexity, cost, and processing overhead of that server likewise increases. For example, the code necessary to authenticate incoming connection requests and the connection setup can increase processing overhead because a separate connection handler thread or process may need be started to handle data for the new connection. Further, additional memory must be allocated per connection to be used to queue packets for each incoming connection when the server is not processing the data fast enough for that connection. As the number of simultaneous connections increases, so does the code size and memory requirements for the server program itself running on the receiver. All of these added complexities increase the cost of the receivers, more physical memory is needed to store programs and connection data and more powerful processors are needed to run these complex server programs. With the advent of less expensive and smaller networked appliances, such as light switches and smoke sensors, there grows a need to reduce the cost of the servers that would be necessary in these devices to receive commands. Likewise, due to the increased network resources needed to continuously keep these devices on-line, a solution for delivering commands to these devices that does not require these devices to continuously be on-line becomes crucial. Finally, as the need for security on sensitive appliances such as cameras and motion sensors becomes ever greater, so does the danger of using embedded servers which have a notorious history of being prone to attack by malicious individuals. Thus, a scheme is needed to deliver data to receivers that is extremely light-weight, in terms of processing and hardware requirements, does not require an always-on connection, and protects against the faults found in traditional embedded server systems today.

SUMMARY OF THE INVENTION

A method and system for communication between serverless computing devices or clients in computers communicating over networks, such as the World Wide Web (WWW) using stateless protocols, e.g., HTTP. In this scheme there are two classes of clients which can operate independently or can be combined in computer communicating over the network: a) Clients that issue commands and request status or data, and b) clients that function as service brokers to provide services and process commands, update status, and provide specific data. Based on the description of the latter client device it would resemble a server device but without directly accessible TCP/IP ports.

Each service provider device is authenticated, retains a unique identity and establishes a soft state with the globally accessible server or servers. All devices and clients can compile and process a globally common command language established between all communicating network clients. The central server includes a CGI processing program and a database to retain client specific information. The server database represents a collection of queues, with each having a client unique identifiable status, pending commands, and/or data components.

In this scheme, commands and signaling transmitted between the servers and the clients utilize standard HTTP protocol semantics and HTML or standard markup language syntax. Clients encapsulate or embed information as parameters passed to HTTP CGI as a set of standard HTTP conversations. A CGI processing program converts, parses and processes each conversation and passes arguments with or without data to queues. Each conversation includes client identification key(s) and commands which are structured as attribute-value pair tuples. The service-handler client connects to the central server and accesses the client queue on the central server to check for any pending commands or update their status in either synchronous or asynchronous maner. The synchronous server access scheme is regulated temporally by either deterministic clocking on server response by a server based adaptive algorithm which can monitor network and client activities and optimize client access patterns.

In one preferred embodiments the invention comprises a service broker for processing data from a data network including at least one data source. The service broker includes a first communication module for initiating communication with a moderator and adapted to receive data from the moderator and a second communication module for sending data to at least one of the data source and the moderator. A service-action module is provided for processing the received data and for performing a task based on the processed data. An export module which is in communication with the service-action module is provided for publishing data based at least in part on the performed task to the data network.

The published data may be published to at least one of the data source and the moderator. The moderator may includes a data store and the first communication module could receive data from the data store. The data store may store data received from the at least one data source. In addition, the data store could be a command queue and the data received from the data source could be a command which is intended to be processed by the service-action module, the first communication module receiving the command from the queue.

In one form of the invention, the first communication module communicates with the moderator via the HTTP protocol. In addition, the data source could also communicate with the moderator via the HTTP protocol.

In another form of the invention, the performed task comprises communicating a command based at least in part on the processed data to a device connected to the service broker.

In another form of the invention, at least one of the moderator and the data source comprises a virtual representation of the service broker and wherein the published data updates the virtual representation. Alternatively, at least one of the moderator and the data source could comprise a virtual representation of the connected device and wherein the published data updates the virtual representation.

The present invention also encompasses a method for transferring data from a data source to a service broker comprising the steps of: providing a data source and a service broker; providing a moderator for receiving the data transferred by the data source; providing a data store for storing data received by the moderator; providing a communications module for transferring data from the data store; providing a virtual representation of the service broker on the data source; transferring data from the data source to the moderator, the data sent being related to or associated with the virtual representation; storing the data received by the moderator in the data store; retrieving the data from the data store via the communications module and forwarding the data to the service broker; updating the virtual representation when the service broker receives the data sent by the data source, whereby data is transferred between the data source and to the service broker.

BRIEF DESCRIPTION OF THE DRAWINGS

For a more complete understanding of this invention, reference should now be made to the embodiment illustrated in greater detail in the accompanying drawing and described below. In the drawings.

DETAILED DESCRIPTION OF THE PREFERRED EMBODIMENT

Figure 1:
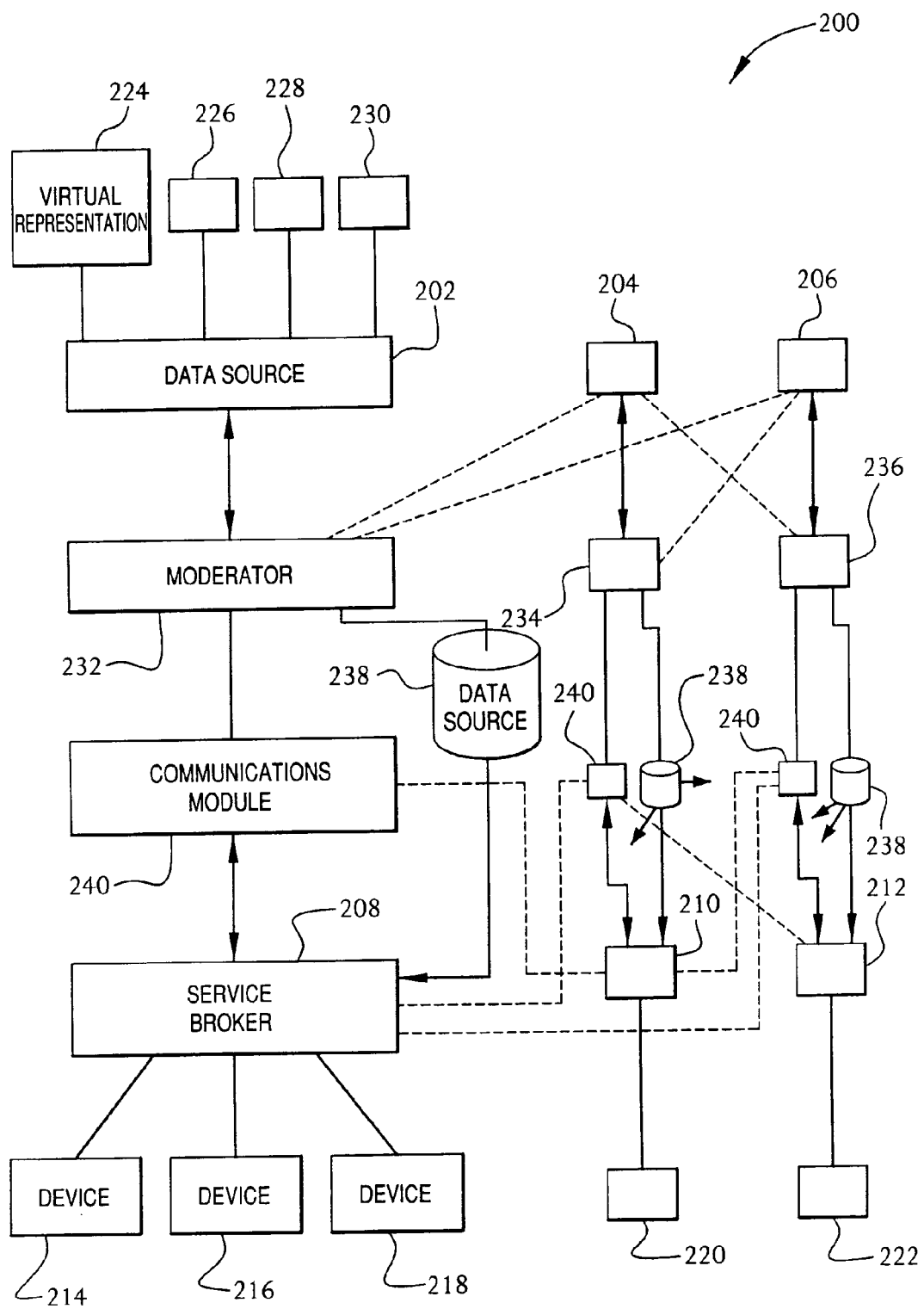
FIG. 1 is a schematic view of a first preferred embodiment of a system for transferring data via a service broker.

In FIG. 1 there is shown a system 200 for transferring data or commands from a data source or command generator to a service broker via a moderator. The moderator allows the service broker to get commands and/or data from the data source without needing the functionality of a server or otherwise some mechanism for listening for the data transmission.

The system 200 includes a data source or command generator 202 that initiates the transfer of commands and/or data intended for a particular service broker. Additional data sources/command generators 204, 206 may also be provided. The system 200 includes a service broker 208 that receives the data/commands from the data sources/command generators. In addition to service broker 208, the system may also include any number of additional service brokers 210, 212.

Each service broker may include connected devices 214, 216, 218, 220, 222. In one form of the invention, these connected devices are the ultimate receivers of at least some of the data commands transmitted from the data sources/command generators 202, 204, 206. The connected devices are described in greater detail in connection with the second preferred embodiment, but for purposes of the current invention are defined as any appliance or electronic equipment that can be communicated with remotely and are capable of being connected to the network.

Each data source/command generator may include a virtual representation of the service brokers and/or the connected devices. For example, as shown in FIG. 1, a virtual representation 224 for the service broker 208, along with virtual representations 226, 228, 230 for the connected devices 214, 216, 218 are present on the data source/command generator 202. It should be understood that the data sources could contain a virtual representation for any or all of the connected devices and service brokers, but have been omitted from FIG. 1 for the sake of clarity.

In addition, the additional data sources/command generators would also preferably include virtual representations of any of the service brokers and/or connected devices. For purposes of the present invention, the virtual representation is a control, group of controls, and/or user interface for a service broker or connected devices that is mapped to a representative control on the connected device and/or service broker.

Between the data sources and the service brokers is a moderator 232 that listens for and accepts data/commands transmitted from the data source/command generators. It should be understood that any number of additional moderators, such as moderators 234 and 236 can also be provided in the present system as necessary or required.

Each moderator includes a data store 238 for temporarily storing the data/commands received by the moderator. The preferred form of the data store is a queue of commands. Such a queue of commands can take any number of forms as known to those skilled in the art.

Each moderator also includes a communications module that functions as a forwarding agent 240 for forwarding data/commands residing on the data store 238 to the service brokers. Preferably, the forwarding agent 240 transmits its data synchronously or asynchronously pursuant to a request from the service broker. Of course, the forwarding agent may function in any suitable way to pass data as known to those skilled in the art.

Data is transferred between the data sources, moderators and service brokers via any suitable data transfer protocol. Preferably, data is transferred using the HTTP protocol between all the devices which are networked together via the global computer network, such as the Internet.

In addition, the data is transferred using name value pairs, with each piece of data being transferred as the value part and identified by the name part. For example, a command x intended for the service broker 208 can be encoded using the name value pair "service broker 208: connected device 214: command x." By transferring data using name value pairs, data can be easily transferred using the HTTP protocol.

In addition to transferring data using name/value pairs, data is preferably transferred using a field value abstraction layer that allows an unlimited number of name value pairs to be transferred.

The service broker 208 is capable of performing many different functions in order to effect the transfer of data. For purposes of the present invention, the different functionalities of the service broker 208 are described in terms of "modules." It should be understood that the "modules" could be implemented in software, hardware, or a combination of the two.

Figure 1A:
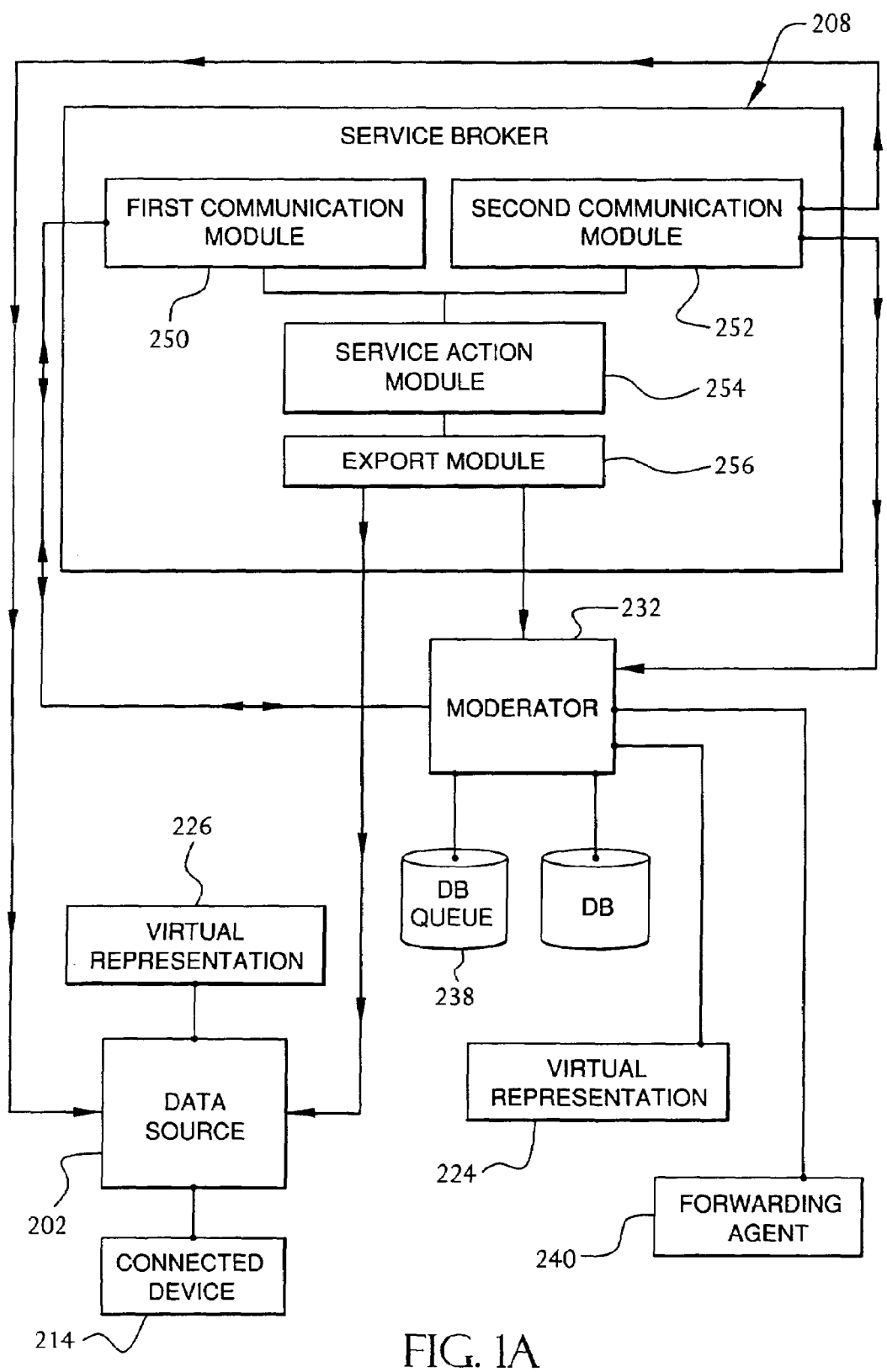
FIG. 1a is a schematic view of the service broker of the system shown in FIG. 1.

As best seen in FIG. 1a, the service broker 208 includes a first communication module 250 for initiating communication with the moderator 232 and is adapted to receive data from the moderator 232. In addition, the first communication module 250 is capable of handling a device identifier and/or class of device identifiers for each connected device and/or service broker. An example of which is given in connection with the command x as described above. The device identifier allows the first communication module to communicate with a particular device, whereas the class of identifiers allows the first communication with a class of similar or otherwise redacted devices.

The service broker 208 includes a second communication module 252 for sending data to the moderator 232 and/or the data source 202. The second communication module 252 is responsible for acknowledging the successful transmission of data to the service broker 208 and is also responsible for updating the virtual representations 224 of the service broker or the connected devices which may be present on the data source 202 and the moderator 232.

The service broker 208 also includes a service action module 254 for processing the data received from the moderator 232 and for performing a tasks based on the processed data. For example, the data source 202 might transmit a command to the service broker 208 via the moderator 232 which is a command for changing the state of one of the connected devices 214. The service broker 208, upon receiving the command, processes the command and passes a command to the connected device 214 in a form which it understands for changing the state of the device. Further examples of the functionality of the service action module 254 are described in connection with the second preferred embodiment which is described in greater detail below.

The service broker 208 also includes an export module 256 which is in communication with the service action module 254. The export module 256 is responsible for publishing data i.e., updates to the virtual representation to the data network and, in particular, to the data source 202 and the moderator 232. It is the export module 256 that is responsible for updating the virtual representation of the service broker and the connected devices and for synchronizing the virtual representation for these devices with the devices themselves. The export module 256 may utilize the services of the second communication module 252 to effect the publication of data.

In operation, data or commands intended for the service broker 208 are transmitted to the moderator 232 and stored a data queue 238. Periodically, the service broker 208 polls the data queue 238 for waiting data. If data is present in the data queue 238, the forwarding agent 240 functions to transfer that data to the service broker 208. The data is received by the first communication module 250 and processed by the service action module 254 and performs whatever task is associated with the received command. If necessary, the service broker 208 interfaces with the connected devices 214 if the transmitted command is intended for one of the connected devices. Once the command has been processed and the task performed, the export module 256 publishes an update based on this performed task back to the data source 202 so that the virtual representation 224 can be updated and synchronized. In this way, data is transferred between a data source 202 to another device, such as a service broker or connected devices, which is not otherwise directly accessible by the data source.

In FIGS. 2–6 there is illustrated a second preferred embodiment of the present invention. This second preferred embodiment is a specific implementation of the invention and concepts described in connection with the first embodiment. The second preferred embodiment is provided to illustrate how the invention can be implemented in a client/server environment over a global computer network having many distributed clients and a centralized server or moderator.

Overview of System Architecture

Client-Side

Figure 2:
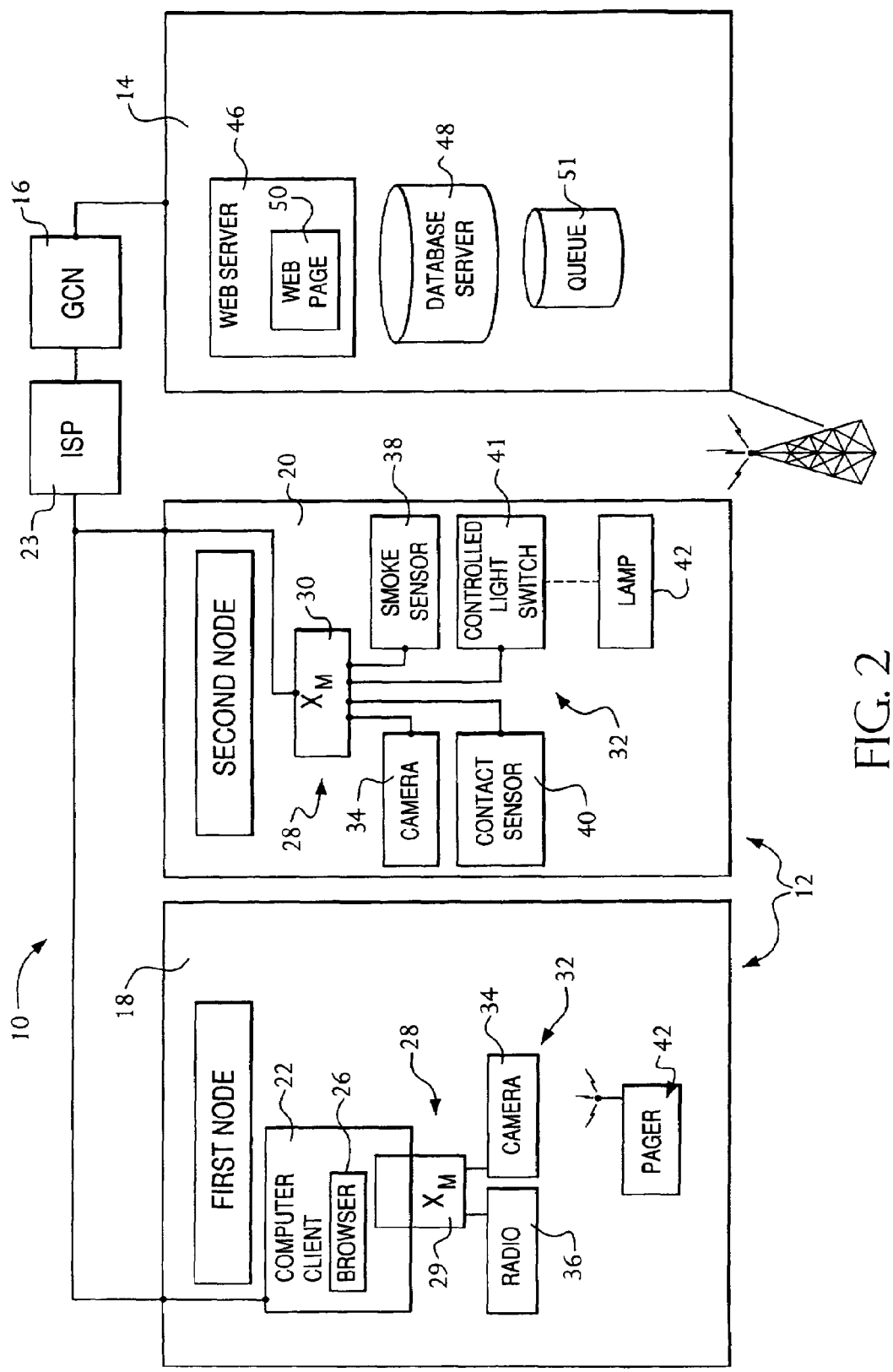
FIG. 2 is a schematic view of a second preferred embodiment of a data transfer system in accordance with the present invention.

In FIG. 2 there is shown a client and server system 10 in accordance with the present invention. The client/server system 10 includes a client 12 and a server 14 which are connected via a global computer network 16, such as the Internet.

The client 12 is operated by a local user (not shown). The client 12 may comprise a plurality of nodes, such as first user node 18 and second user node 20. It should be understood that the nodes 18 and 20 may be located at a single location, such as the user's house or at separate locations such as the user's main house and the user's vacation house. The present invention contemplates a plurality of local user locations and/or a plurality of remote user locations.

In one form of the invention, the user node 18 includes a client computer 22 that is connected to the global computer network 16 via an Internet Service Provider (ISP) 23 by any conventional means, such as a dial-up connection, DSL line, cable modem, satellite connection, or T1 line. The client computer 22 includes an Internet browser program 26 for accessing web pages via the global computer network 16.

A monitoring module 28 is also provided which serves as a gateway between the server 14 and at least one connected device 32. The monitoring module can take various forms, such as a software program 29 running on the client computer (as shown at node 18). Alternately, the monitoring module 28 can take the form of a stand-alone appliance 30 (as shown at node 20) which is connected to the global computer network 16 and operates separately and independently from the client computer 22. The monitoring module 28 is described in greater detail below.

At least one, and preferably a plurality of, device or appliance 32 is connected to and controlled by each monitoring module 28. The connection between the monitoring module 28 and the various devices 32 can be wired or wireless.

The appliances 32 encompass a multitude of devices which are capable of being controlled or mediated by an external controller. Such appliances include camera 34, radio 36, smoke or fire detector 38, contact sensor 40, and light switch 41. Although not illustrated, it should be understood that the present invention encompasses many other such devices such as various audio input and output devices, various visual displays, washers/driers, microwave ovens, cooking ranges, car alarms, plant watering devices, sprinkler, thermostats, carbon monoxide sensors, humidistats, rain gauges, video cassette recorders, radio tuners, and the like.

In addition, a myriad of notification devices, such as pager 42, can also be incorporated into the system. As best seen in FIG. 2, the pager 42 is in wireless communication with a wireless or cellular transmitter 44 associated with the server component 14. Other notification devices besides the pager 42 are also contemplated by the present invention including, e-mail clients, wireless hand-held computers, wireless wearable computer units, automatic web notification via dynamic web content, telephone clients, voice mail clients, cellular telephones, instant messaging clients, and the like.

Server-Side

The server 14 of the present invention includes a web server 46 and a database server 48. The web server 46 generates static web pages and dynamic web pages from data contained in the database server 48. The web pages 50 can be viewed by the user on the Internet browser 26 running on the client computer 22.

It is contemplated that the client 12 and the server 14 communicate over the global computer network 16 via the conventionally available TCP/IP environment using the HTTP protocol. Of course, it should be understood that any request-response type of protocol and socket-based packet transport environment would also be suitable and within the scope of the contemplated invention.

It is also contemplated that the server 14 of the present invention functions as the master controller of the system 10. In addition, the client-server configuration of the system 10 and the connection of the system 10 to the global computer network 16 via an ISP 23 allow a user to access the system 10 via any computer, monitoring appliance or similar device connected to the global computer network 16.

In this way a user is able to control and monitor a plurality of devices 32 connected to the monitoring module 29 at node 18 and a plurality of devices 32 connected to the networked monitoring module 30 at node 20. The devices 32 can be accessed via any personal computer 22 by accessing the control server 14 via the global computer network 16. By using a global computer network 16 it should be clear that a user, or anyone the user permits access to, can readily monitor and control the monitoring modules 28 at nodes 18 and 20, from any location, using any suitable device that has access to the global computer network 16.

The Monitoring Module

Figure 3:
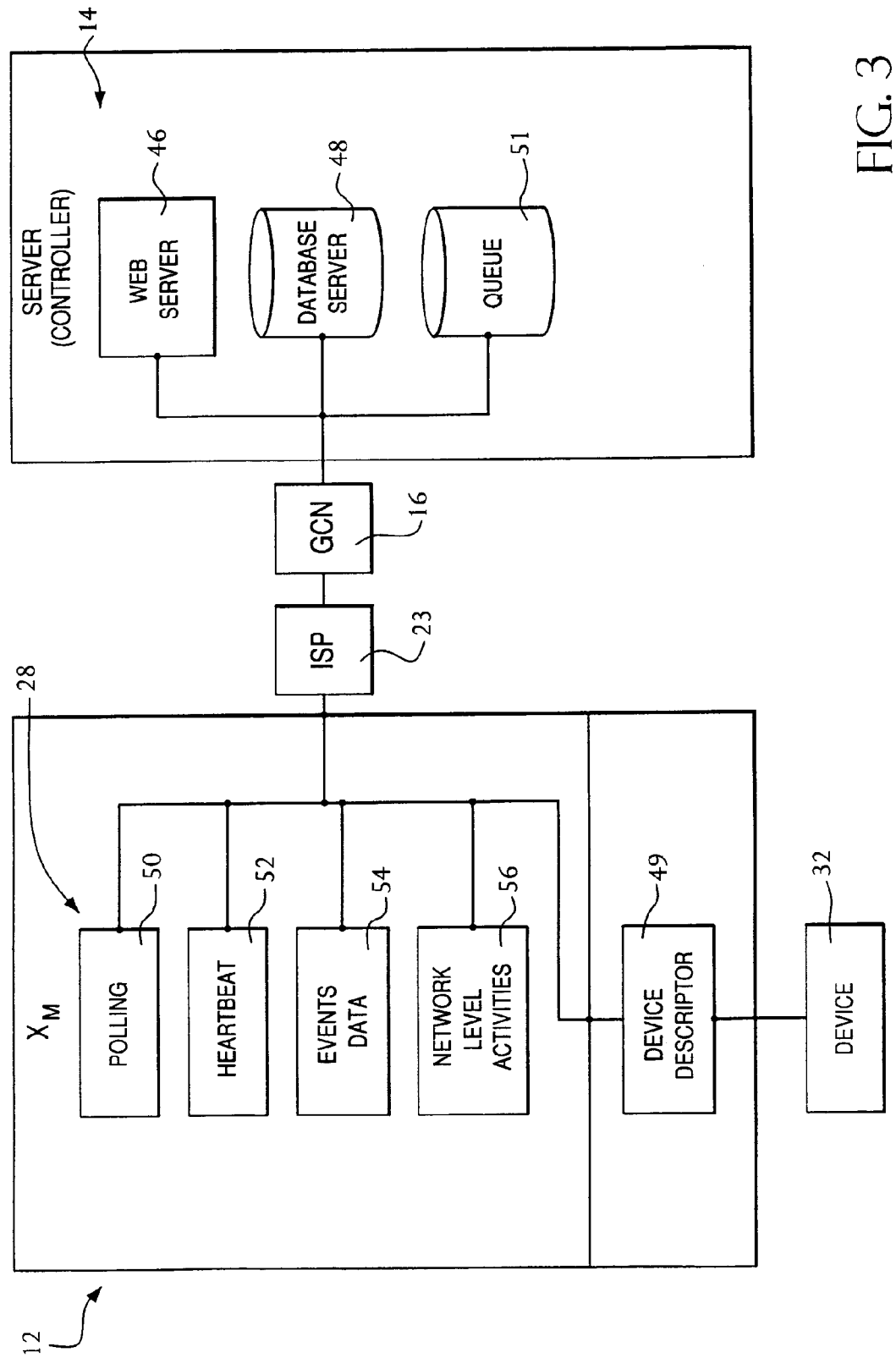
FIG. 3 is a schematic view of the client and server components of the system shown in FIG. 2.

Referring now to FIG. 3, the monitoring module 28 serves as the connection hub for the controlled devices 32 and as the gateway for brokering communications between the devices 32 and the control server 14 via the global computer network 16.

One of the functions of the monitoring module 28 is to serve as a translation and brokering agent between the server 14 and the connected devices 32. In its software form 29, the monitoring module 28 comprises a plurality of dynamically loaded objects, or device descriptors 49 that allow the server 14 to interface with the connected devices 32. The dynamically loaded device descriptors 49 act as the device drivers for the connected devices 32, translating, in both directions, the monitoring, command, and control data that is sent and received between the monitoring module 28 and the server 14 via the global computer network 16. Each device descriptor 49 also translates the signals received from the monitoring module 28 into the specific electrical signals that are required to communicate with, both input and output, and control its associated device 32. In addition, because each device 32 has its own specific interface and requires a specific set of electrical signals to monitor and control it, a different device descriptor 49 must be provided for each specific model of each device 32.

The monitoring module 28 also controls the communication between the server 14 and the connected devices 32 via the global computer network 16. The HTTP protocol employed by the existing global computer network is a stateless protocol. Since the knowledge of the current state of the connected devices is vital to the successful operation of the system 10, it is necessary for the monitoring module 28 to store the persistent state of the connected devices 32 and to provide a system for periodically updating and obtaining the state of each connected device 32 for obtaining commands from the server 14. The monitoring module 28 does this by polling 50 the server 14 and maintaining a system heartbeat 52.

The monitoring module 28 polls 50 by scheduling a transmission between the monitoring module 28 and the server 14 in which it checks for commands from the server 14. If commands are waiting on the server 14, the server will return commands in an algorithmic manner, that can take various forms, for processing and also informs the monitoring module that N commands are waiting in the queue. The monitoring module 14 will then poll the server 14 and retrieve data from the server 14 until there are no more commands in the queue. In this way, commands from the server 14 can be delivered to the monitoring module 28 to effect changes in the devices 32 over the stateless medium of the existing global computer network 16.

In a typical polling operation 50, the client computer 22 issues a command for incurring a change in state of one of the control devices 32. The change in state command is posted to a data store 51, such as a command queue associated with the server 14. Similarly, if the server 14 desires to make an internal change to the monitor 28, such as setting or modifying the polling 50 or heartbeat 52 time intervals, these commands are likewise posted to the storage device 51. Upon reaching the end of the current polling interval, the monitoring module 28 sends a transmission to the server 14, requesting any queued commands. The monitoring module 28 continues to poll, using a preselected transmission scheme, until the queue of commands waiting for the monitor 28 is complete. Each command received from the queue is acted upon when it is received and any associated state changes are effected. The server 14 transmits an acknowledgment of receipt and successful processing of the data back to the monitoring module 28.

The monitoring module 28 is also responsible for maintaining a heartbeat 52 or a scheduled periodic update regime to refresh the current state of the devices 32 stored in the database server 48. The primary function of the heartbeat 52 is to synchronize the states of the devices 32 and the virtual representation of those devices stored on the server 14. The heartbeat 52 also functions to send device events and state changes between the devices 32 and the server 14 to effect this synchronization of the control server 14 and to assure that the monitoring module 28 and the server 14 are synchronized.

Not only is the monitoring module able to send commands to the server 14, but the server 14 is able to send commands back to the monitoring module 28. The types of transmissions that cause the server 14 to send unsolicited transmissions back to the monitoring module 28 are to set or update the heartbeat or polling time and to issue a command to update a component of a device.

In a typical heartbeat operation 52, the monitoring module 28 sends a transmission to the server 14 in response to a change in state of a connected device 32, a synchronization of a control device 32 with server 14, a triggered alert event, or the like. In such a heartbeat operation 52, all data intended to be transmitted to the server 14 is transmitted to the server 14 via the global computer network. The server 14 transmits an acknowledgment of receipt and successful processing of the data back to the monitoring module 28.

Along with maintaining the polling and heartbeat operations and sending and receiving events, data, and commands 54 to and from the server 14, the monitoring module 28 also takes care of many network level activities 56 such as verifying passwords, dialing up the ISP if necessary, periodically uploading accounting/billing information, and performing security measures.

Another function of the monitoring module 28 is the storage of the persistent state of the devices 32. In the event that the user's computer 22 crashes and the monitoring module 28 must be restarted, many of the parameters that were negotiated between the monitoring module 28 and the server 14 during the registration process are stored in the memory of the monitoring module.

Device Interface and Descriptors

Figure 4:
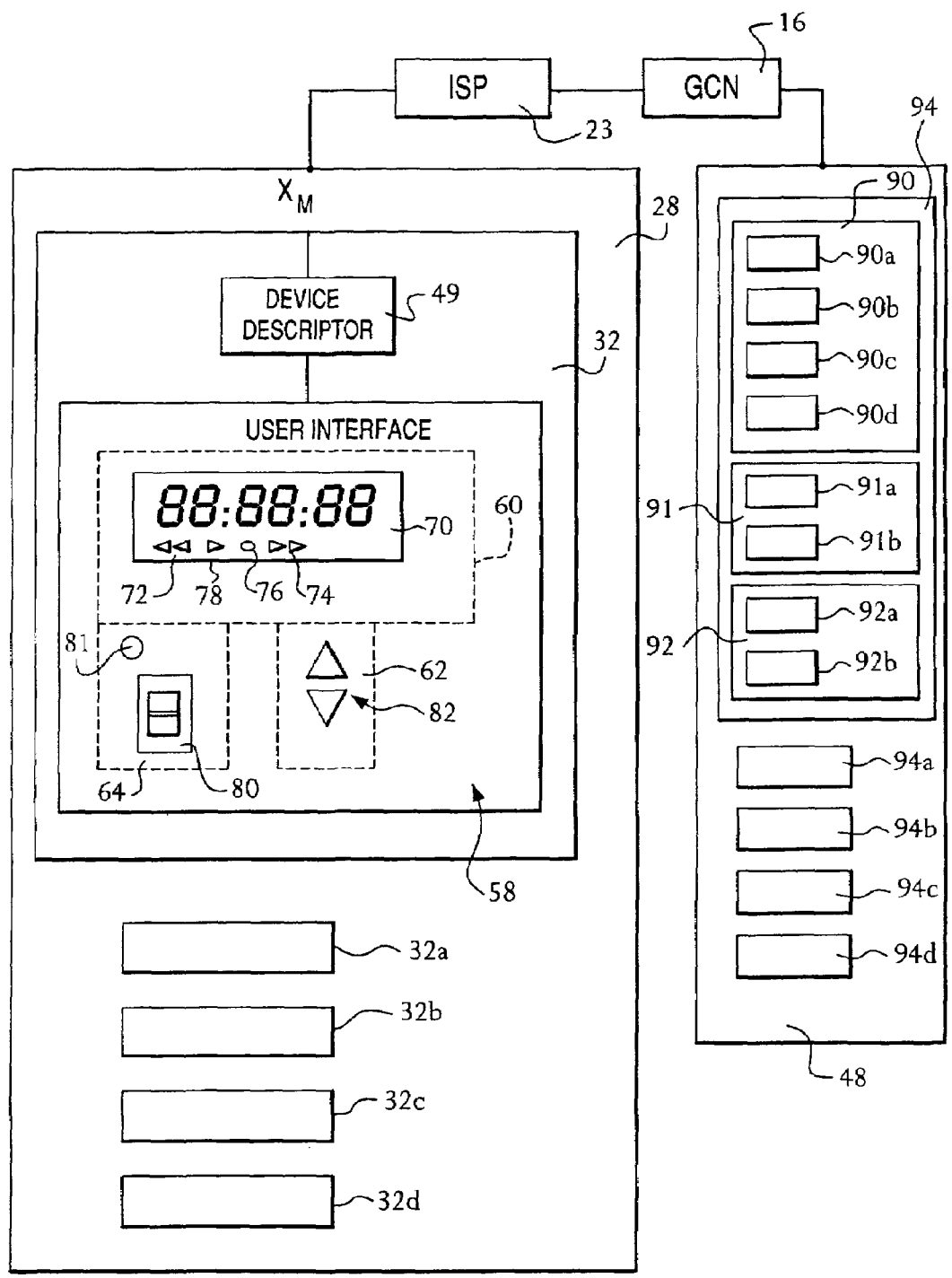
FIG. 4 is a schematic view of the controlled devices and virtual representation of same in the server database of the system shown in FIG. 2.

Referring now to FIG. 4, a series of devices 32, 32a, 32b, 32c, 32d is shown. Each device is connected to a monitoring module 28 via a device descriptor or driver 49 (only one shown). Each device may include a customizable user interface 58 that is viewable on the client computer 22 over the global computer network 16 through a virtual representation of the user interface stored on the web server 46, as explained below. The user interface 58 comprises at least one resource or sub-devices 60, 62, and 64. Typically, a resource provides a specific functionality of the device. For example, the device shown in FIG. 4 represents a VCR having a recording setting resource 60, a channel selecting resource 62, and a power selecting resource 64. Of course, a typical VCR would have many other operational resources, but the resources illustrated are sufficient to describe the basic operation of the device.

Each resource 60, 62, 64 is made up of components or the basic building blocks of the user interface 58 of the device. For example, the recording setting resource 60 comprises a display component 70 and a series of pushbuttons 72, 74, 76, 78 which activate the VCR's fast forward, reverse, play, and stop functions, respectively. The channel selecting resource 62 comprises the display component 70 and a pair of pushbuttons 82 which activate the up channel and down channel functions of the VCR. The power selecting resource 64 comprises a toggle switch 80 for activating the VCR's power on and power off commands and an LED indicator 81 which indicates the power condition of the VCR.

A virtual representation of each device 32, 32a, 32b, 32c, 32d also exists as a record 94, 94a, 94b, 94c, 94d in the database server 48 of the control server 14. Each record contains an entry for each resource and its associated components which make up the device. For example, The record 94 for the VCR device 32 contains an entry 90, 91, 92 for each resource 60, 62, 64 and an entry 90a, 90b, 90c, 90d, 91a, 91b, 92a, 92b for each component 70, 72, 72, 74, 80, 81, 82, respectively. In addition, a web page 50 can be generated by the web server 46 by extracting the associated record for that device from the database server 48 and creating a graphical, textual, tactile, aural, or other similar modality user interface representation of that device which a user can access via the Internet browser 26.

Basic Operation of the System

In operation, the client 12 first registers with the server component 14 to begin using the services offered therein by accessing the web server 46 of the server component 14 via the client browser 26. At this point, an account is opened for the client 12 and the user's information is stored in the database server 48. If it has not been previously registered, the monitoring modules 29 and 30 would also be registered with the server component 14 and their information would also be stored in the database server 48 and associated with the node 18. Once the monitoring modules 29 and 30 have been registered, any device 32 that is attached to either of the monitoring devices 29 and 30 would also be registered in the system, stored in the database server 48, and available to the user. Each device 32 communicates with the monitoring modules 29, 30 and either exports its interface to the database server 48 or otherwise obtains a default interface configuration, as explained in greater detail below. These interfaces, as described in greater detail below, are adapted to be displayed, to be viewed, and to be interacted with by the user via the client browser 26 over the global computer network 16 by accessing the web server 46.

A few uses of the present system 10 will now be explained to aid in the understanding of the operation. For example, the contact sensor 40 could be associated with the front door (not shown) at the remote location 20 and set to trip whenever the front door is opened. The camera 34 is also positioned to view the front door location and can be programmed to take a digital photograph whenever the sensor contact 40 is tripped and transmit that photograph to be stored in the database server 48. When, in fact, the contact sensor 40 detects that the front door has been opened, an event notification or alarm trigger is transmitted by the monitoring module 30 to the database server 48 which has been previously programmed to transmit a notification event to the user's pager via the cellular transmitter 44. As the contact sensor is tripped, the camera 34 takes a picture of the front door and transmits that picture via the monitoring module 30 via the global computer network 16 to the database server 48. The user, having been notified via the pager 42, can now access the web server 46 of the server component 14 via his Internet browser 26 to retrieve the photograph that has been stored on a database server 48. In this way, the user can determine whether an intruder has entered via the front door of his vacation home or whether his family has just arrived for their vacation.

Another use for the system 10 would be for the user located at the node 18 to be able to control his lamp 42 at his vacation home located at node 20. The user would contact the web server 46 via his Internet browser 26 to access the database entry of the light switch 41. A virtual representation of the light switch 41 would be available on the web server 46 and could be manipulated by the user to remotely change the state of the light switch 41 and the connected lamp 46, say from being "off" to being "on." To do this, the user would simply manipulate the on/off virtual representation of the light switch on the web server 46 and this command would be placed in a queue of waiting commands on the server component.

Periodically, the controlling module or monitor 30 polls the server component 14 looking for waiting commands, such as the change state command of the light switch 41. Thereafter, the command would be transmitted to the monitoring device 30 which would instruct the light switch to change from the "off" state to "on" state, and, thus, turning on the lamp 46. This change in state of the lamp 46 could be viewed by an appropriately positioned camera, such as camera 34, which would be used to visually monitor the remote location 20 to determine whether the command had been completed successfully.

Since the monitoring module 28 receives data and commands from the client 12, it is considered to be a service broker for purposes of the present invention. The service broker 28 does not include a server which would otherwise receive data and commands sent to the service broker 28. Since the service broker 28 lacks a server functionality, the present invention utilizes a polling scheme incorporated into the HTTP protocol so that the service broker 28 can receive data and/or commands initiating from the client 12 or server 14.

In addition, it is also a common situation that a service broker 28 may not have a permanent connection to the global computer network 16, such as might be the case if there was a dial-up connection between the service broker 30 and the ISP 23 as shown in FIG. 2. As such, data and commands sent to the service broker 30 while it is not connected to the global computer networks 16 may never reach the service broker 30. The present invention overcomes this problem by incorporating the polling scheme in which the service broker 30 connects to the global computer network as needed and polls for data waiting for it.

Figure 5:
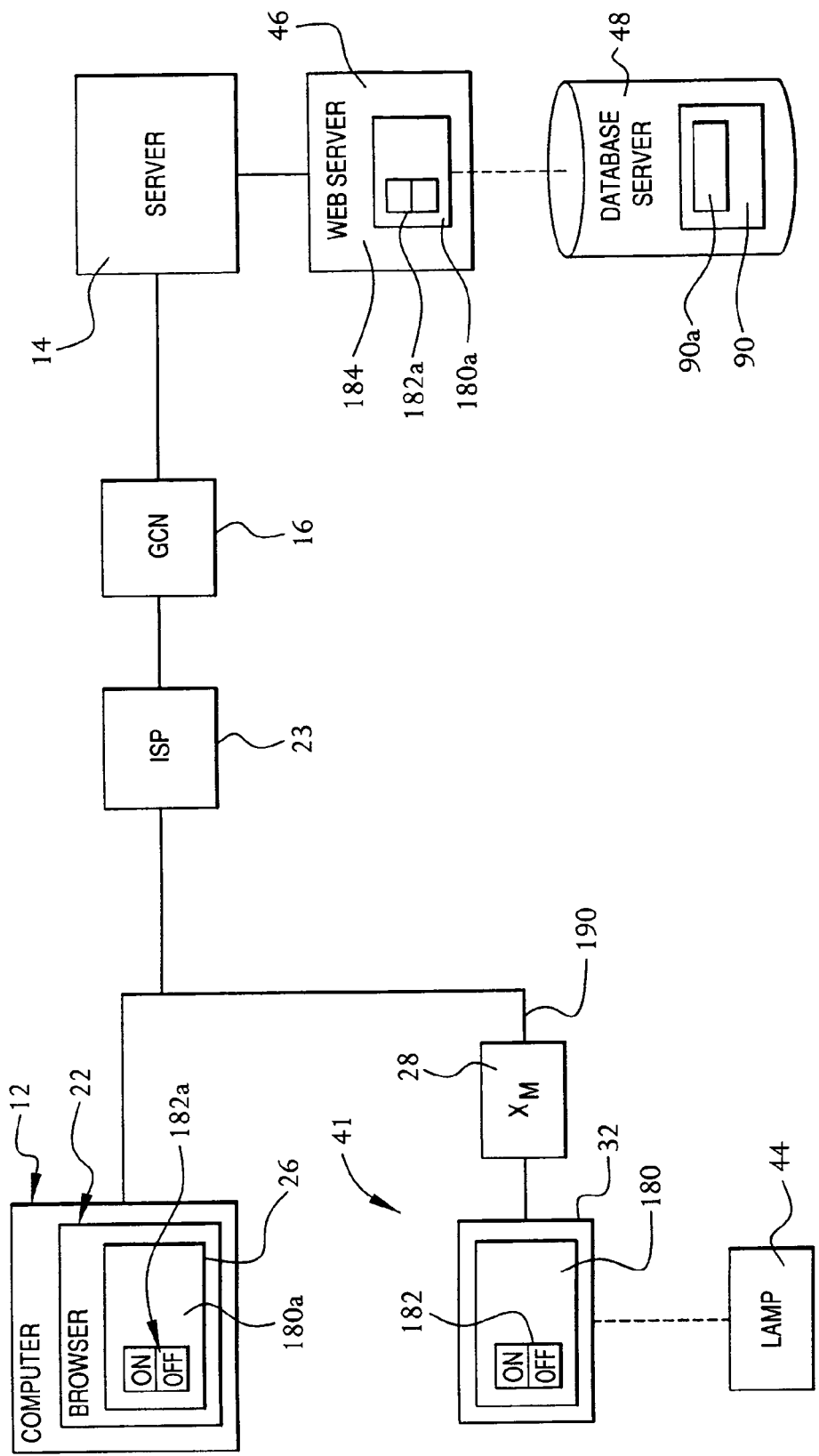
FIG. 5 is a schematic view of a simplified data transfer system having a service broker in accordance with the present invention.

In FIG. 5, there is shown a simplified schematic of the data transfer system of the second preferred embodiment of the present invention. A client 12 is connected to a server 14 via the global computer network 16 via an ISP 23. The client 12 comprises a computer 22 that is networked to the global computer network 16 via any suitable local network configuration, topography, and/or wired or wireless media. The client also includes a world wide web Internet browser 26 for accessing web pages on the global computer network 16. It should be understood that the client 12 can be any source of data that is capable of transmitting that data and includes such devices as home appliances, cameras, home gateways, and the like.

The server 14 includes a web server 46 for serving-up web pages and a database server 48 for storing data. For purposes of the present invention, other suitable servers include gateways, firewall servers, ISP gateways, network enabled cameras, networked home appliances and the like.

At least one service broker 28 is connected to the global computer network 16. Suitable service brokers include home appliances, computers, cellular phones, personal digital assistants, and the like. A plurality of controlled devices 32 can be connected to each service broker 28 as described below.

The device 32 illustrated in FIG. 5 is a light switch module 41; however, it should be understood that this device could be any similar device that receives data and is networked to the global computer network 16 such as a video camera, a thermostat, a sensor, a door opener, a door lock, a video cassette recorder, ovens, dish washers, and the like. The light switch module 41 includes a user interface 180 for controlling the light switch. In this case, the user interface 180 includes a on-off switch 182 for selectively providing an attached light or lamp with electricity.

The virtual representation 180*a* of the user interface 180 is stored in the database server 48 and can be viewed on a web page 184 generated by the web server 46. The virtual interface 180*a* has all the components normally associated with the real user interface 180 including a virtual on-off switch 182*a* for controlling the power state of the switch. The client 12 is able to access the virtual user interface 180*a* and its virtual control 182 by accessing the web page 184 on the web server 46 by use of the client's Internet browser 26.

Typically, commands and data are sent to the service broker 28 and relayed to the connected devices 32 by the user manipulating the virtual user interface on the web page 184 via the Internet browser 26. For example, the user may manipulate the virtual on-off switch 182*a* which would send a command over the global computer network 16 to the database server 48 which contains an entry 90 for the light switch 41 and an entry 90*a* for the on-off switch 182*a*. The manipulation of the on-off switch 182*a* would necessitate a change in state of the light switch 41 which must be communicated to the service broker 28 and to the light switch 41 via the global computer network by a command issuing from the client 12 via the server 14 for that command to actually take effect on the lamp 44. As such, the client 12 and the server 14 comprises the data source, albeit a distributed data source. In addition, the server 14 functions as the moderator.

It should also be understood that other commands could issue from the server 14 that must be communicated with the service broker 28 such as heartbeats, polling commands, device or control specific commands, commands to manipulate the client's data rate, commands to update the service broker's components, and the like. The commands are in the form of a triple, i.e., the service broker name, device name, command.

Since in this embodiment the service broker 28 lacks a server for listening for commands issued by the server 14 and/or since the service broker 28 does not have a permanent connection to the global computer network 16, the server 14 is unable to communicate with the service broker 28. Therefore, the present invention incorporates a polling scheme to communicate with the service broker 28 in which the service broker 28 periodically polls the server 14 to determine if any commands or data is waiting for it.

Figure 6:
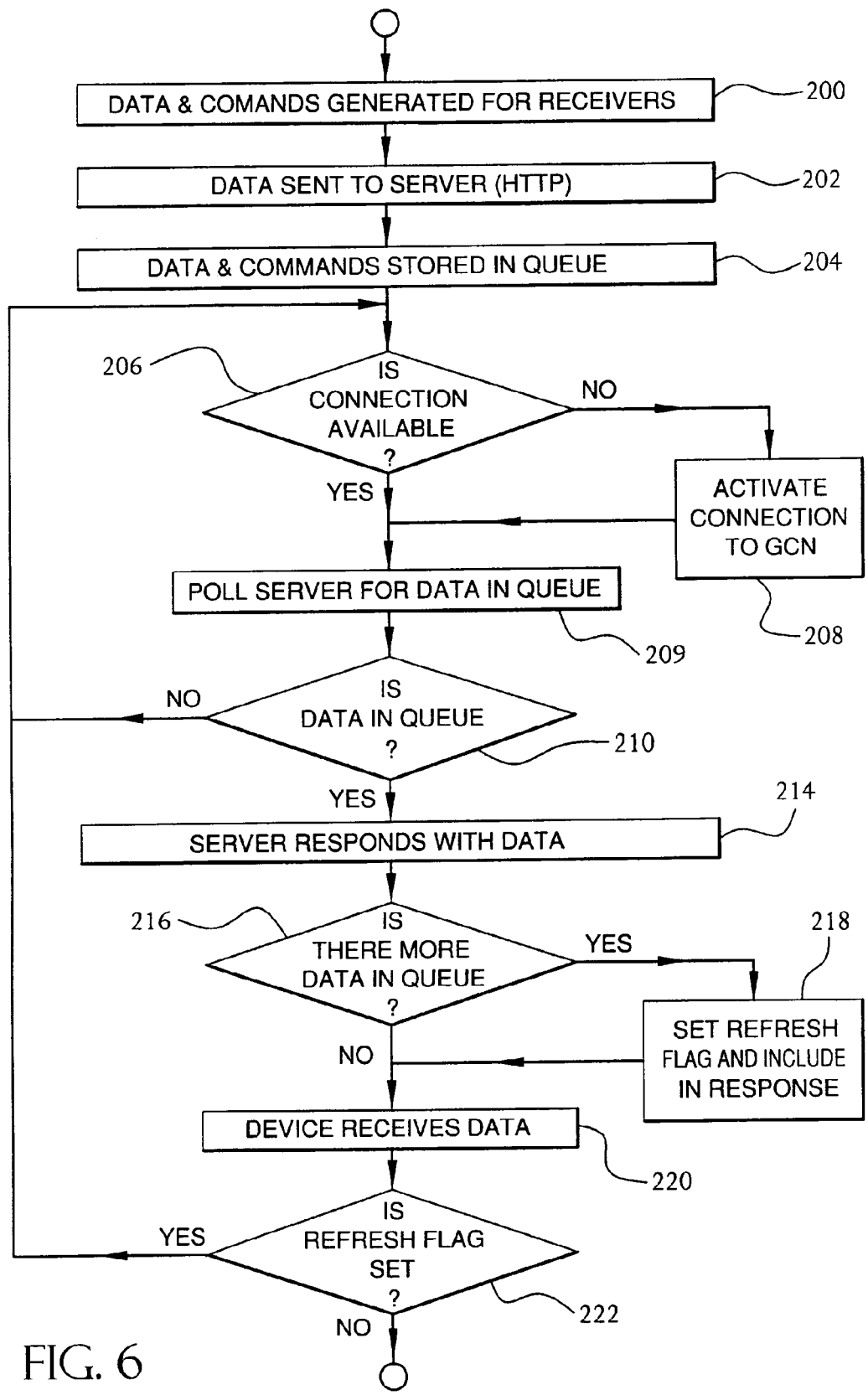
FIG. 6 is a flow chart of the polling scheme for communicating with a service broker in accordance with the present invention.

Referring now to FIG. 6, a flow diagram of the polling scheme of the present invention is depicted. As described above, commands are first generated 200 for the service brokers 28. These commands can initiate from the client 12, the server 14, and from the ISP 23. The commands are then sent 202 to the server 14 via the global computer network 16 using the HTTP protocol. The commands are assigned a unique ID and are stored in a queue or other temporary storage 204 on the server 14 such as the database server 48. The stored commands are accessible by the service broker 28 when it polls the server 14 for the data waiting for it in the queue. Since the commands are stored in a queue, commands are stored in the order in which they are received.

On the service broker-side of the polling scheme, the service broker 28 first checks to see if a connection to the global computer network is available 206. For example, the service broker may be connected to the global computer network 16 via a dial-up connection to ISP 23, in which case a connection to the global computer network 16 must be established 208. Once a connection to the global computer network 16 is available, the service broker 28 would poll the server 14 for data or commands waiting for it in the queue 208. The poll contains a known string that signifies to the server 14 a request for data and contains the service broker's name. Upon receiving the poll, the server 14 parses the poll transmission and detects the polling token string and the name of the service broker. Thereafter, the service broker 28 relays the commands to the connected devices 32 as appropriate.

If the queue 210 is empty, the server 14 responds 212 to the service broker indicating that there is no data or commands waiting for it. Thereafter, at a pre-selected time interval, the service broker 28 initiates another poll to determine if any new data or commands are waiting for it in the queue. If commands are waiting in the queue 210, the server responds 214 positively with a pre-selected packet of data containing the first queued command. However, if additional commands are waiting in the queue, the response includes a flag to indicate that additional data is waiting in the queue.

If there is no additional data waiting in the queue 216, the refresh flag is not set and this status is included in the server's response to the poll. In the preferred embodiment, the poll request is performed using the post method with data being transferred as name/value pairs in the HTTP header field, and the server's response is merely a response to the POST.

In step 220, the service broker 28 receives the queued command along with the refresh flag. The service broker 28 parses the response from the server to retrieve the command portion and device name and delivers the commands to the appropriate device 32. The service broker 28 then parses the command to see if the refresh flag has been set 222 indicating that additional data is waiting in the server's queue for it. If additional data is waiting in the queue, the service broker again polls the server 14 to retrieve the remaining data as in step 208 and the process continues until there is no more data waiting in the queue and the refresh flag is no longer set.

In this way, data and commands get from the client 12 or server 14 to the service broker 28 via the global computer network using the HTTP protocol by first being held in a queue on the server and forwarded as a response to a poll request from the service broker 28. This continues until the entire queue on the server is flushed. In this way, all pending commands and data are eventually delivered to the service broker 28 when requested by the service broker 28.

The operation of the polling scheme of the present invention will now be described in connection with the embodiment illustrated in FIG. 5. If the user wanted to change the state of a lamp 44 connected to light switch 41 from off to on using the system of the present invention, the user would call up the web page 184 on server 14 that contained the virtual user interface 180*a* for the light switch 41. The user would do this by using his Internet browser 26 to access the web page 184 via the global computer network 16. The web server 46 generates web page 184 by retrieving the user interface 182*a* for the light switch 41 stored in the database server 48. The user would then manipulate the virtual on-off control 182*a* for the light switch on the web page 184 using the browser 26. This manipulations of the virtual on-off control 182*a* issues a command for the light switch 41 which is placed in the server's queue.

Using the algorithm described in connection with FIG. 6, the service broker would periodically poll the server 14 to see if data was waiting for the devices connected to it, such as the light switch 41. In the instant case, the change in state of the on-off switch would be waiting in the server queue. The server would retrieve this data waiting in the queue and, assuming that additional commands are waiting in the light switch queue, the server 14 would set the refresh flag to indicate that data was still waiting for the light switch control 41 in the queue. The server 14 would then respond to the poll request by transmitting the command data and the refresh flag to the service broker 28 that the light switch is connected to.

As described in connection with the monitoring appliance 28, the data is then passed off to the device descriptor for the light switch control 41 that is running as a software module on the monitoring appliance 28. The data is processed by the device descriptor and the light switch control 41 changes its state to match the command. This change in state generates a change-in-state command which is transmitted to the entry 90 for the light switch 41 in the database server 48. The entry for the on-off switch control 90*a* would be changed according to the change effected in the virtual representation of the switch 182*a* and stored therein. Since the refresh flag was set, the service broker would poll the server 14 again requesting the additional data waiting for it in the server queue. The server 14 would then return the remaining data in the queue and indicate via the refresh flag that no additional data was waiting in the queue. In this way, the change-in-state command is issued over the global computer network 16 to the monitoring appliance 28 where it is processed with the previous commands and issued to the lamp 44 connected to the light switch control 41 which would change the state of the light switch from off to on. In this way, a user is able to communicate with a service broker that does not contain a server via the global computer network 16.

While certain preferred embodiments in various modifications thereto have been described or suggested, other changes in these preferred embodiments will occur to those of ordinary skilled in the art which do not depart from the broad inventive concepts of the present invention. Accordingly, reference should be made to the appended claims rather than the specific embodiment of the foregoing specification to ascertain the full scope of the present invention.

What is claimed is:

1. A service broker system for interactive monitoring and control of data to and from computers and Internet enabled devices of a client/server safety system over the Internet, for processing data from a data network including at least one data source, the system comprising:
    a first communication module for initiating communication with a moderator and adapted to receive data from the moderator;
    a second communication module for sending data to at least one of the data source and the moderator;
    a service-action module for processing the received data and for performing a task based on the processed data; and
    an export module in communication with the service-action module and for publishing data based at least in part on the performed task to the data network;
    wherein at least one of the moderator and the data source comprises a virtual representation of the service broker and wherein the published data updates the virtual representation.

2. A service broker system for interactive monitoring and control of data to and from computers and Internet enabled devices of a client/server safety system over the Internet, for processing data from a data network including at least one data source, the system comprising:
    a first communication module for initiating communication with a moderator and adapted to receive data from the moderator;
    a second communication module for sending data to at least one of the data source and the moderator;
    a service-action module for processing the received data and for performing a task based on the processed data; and
    an export module in communication with the service-action module and for publishing data based at least in part on the performed task to the data network
    wherein the performed task includes communicating a command based at least in part on the processed data to a device connected to the service broker system, at least one of the moderator and the data source comprises a virtual representation of the connected device and wherein the published data updates the virtual representation.

3. A method for transferring data from a data source to a service broker system for interactive monitoring and control of data to and from computers and Internet enabled devices of a client/server safety system over the Internet, the method comprising the steps of:
    providing a data source and a service broker;
    providing a moderator for receiving the data transferred by the data source;
    providing a data store for storing data received by the moderator;
    providing a communications module for transferring data from the data store;
    providing a virtual representation of the service broker on the data source;
    transferring data from the date source to the moderator, the data sent being related to or associated with the virtual representation;
    storing the data received by the moderator in the data store;
    retrieving the data from the data store via the communications module and forwarding the data to the service broker; and
    updating the virtual representation when the service broker receives the data sent by the data source, whereby data is transferred between the data source and to the service broker.

4. The method set forth in claim 3, wherein the data transferred from the data source to the moderator is performed using the HTTP protocol.

5. The method set forth in claim 4, wherein the data is transferred using name/value pairs.

6. The method set forth in claim 5, wherein the name/value pair is transmitted using a field/value abstraction layer.

7. The method set forth in claim 3, wherein the data transferred from the moderator to the service broker is performed via the HTTP protocol.

8. The method set forth in claim 7, wherein the data is transferred using name/value pairs.

9. The method set forth in claim 8, wherein the name/value pair is transmitted using a field/value abstraction layer.

10. The method set forth in claim 3, wherein the data is a command for changing the state of the service broker and wherein the virtual representation is updated when the state of the service broker is changed.

11. The method set forth in claim 10, wherein at least one device is connected to the service broker and wherein the command is received by the service broker and forwarded to the at least one connected device.

12. The method set forth in claim 3, wherein the data sent is a command for changing the state of the service broker.

13. The method set forth in claim 3, wherein the moderator and the data store are the same entity.

14. The method set forth in claim 3, wherein the data store and the communications module are the same device.

15. The method set forth in claim 3, wherein the moderator, data store, and the communications module are the same entity.

16. The method set forth in claim 3, wherein there are a plurality of data stores.

17. The method set forth in claim 3, wherein there are a plurality of service brokers.

18. The method set forth in claim 3, wherein there are a plurality of moderators and data stores.

19. The method set forth in claim 3, wherein the data source and the service broker are at the same node.

20. The method set forth in claim 3, wherein the data store is a queue of commands.

21. The method set forth in claim 3, wherein the data transferred from the data store to the service broker is initiated by the service broker.

22. The method set forth in claim 3, wherein the data is retrieved by specifying a specific device identifier.

23. A service broker system for interactive monitoring and control of data to and from computers and Internet enabled devices of a client/server safety system over the Internet, for processing data from a data network including at least one data source, the service broker system comprising:
- a first communication module for initiating communication with a moderator and adapted to receive data from the moderator;
- a second communication module for sending data to at least one of the data source and the moderator;
- a service-action module for processing the received data and for performing a task based on the processed data; and
- an export module in communication with the service-action module and for publishing data based at least in part on the performed task to the data network;
- wherein at least one of the moderator and the data source comprises a virtual representation of the service broker system and wherein the published data updates the virtual representation, and wherein the virtual representation comprises a mapped control, group of controls, or user interface.

* * * * *